(12) United States Patent
Skerlos et al.

(10) Patent No.: US 11,602,815 B2
(45) Date of Patent: Mar. 14, 2023

(54) MACHINING SYSTEMS UTILIZING SUPERCRITICAL FLUIDS

(71) Applicant: Fusion Coolant Systems, Inc., Canton, MI (US)

(72) Inventors: Steven J. Skerlos, Ann Arbor, MI (US); Scott Jones, Royal Oak, MI (US); Matthew Spriggs, Plymouth, MI (US)

(73) Assignee: Fusion Coolant Systems, Inc., Canton, MI (US)

( * ) Notice: Subject to any disclaimer, the term of this patent is extended or adjusted under 35 U.S.C. 154(b) by 257 days.

(21) Appl. No.: 16/263,194

(22) Filed: Jan. 31, 2019

(65) Prior Publication Data

US 2020/0246928 A1    Aug. 6, 2020

(51) Int. Cl.
*F17C 7/00* (2006.01)
*B23Q 11/10* (2006.01)
*F16N 7/38* (2006.01)

(52) U.S. Cl.
CPC ............ *B23Q 11/1061* (2013.01); *F16N 7/38* (2013.01); *F17C 7/00* (2013.01); *F17C 2221/013* (2013.01); *F17C 2225/0115* (2013.01); *F17C 2225/036* (2013.01); *F17C 2227/0135* (2013.01); *F17C 2227/0302* (2013.01); *F17C 2270/0545* (2013.01)

(58) Field of Classification Search
CPC ...... F17C 7/00; F17C 7/02; F17C 7/04; F17C 2225/0115; F17C 2221/013; F17C 2227/0304; F17C 2260/042; F17C 2270/0545; F17C 2270/0518; F17C 2225/036; F17C 2227/0135; F17C 2227/0302; B23Q 11/122; B23Q 11/1061; B23B 39/02; F16N 7/38
See application file for complete search history.

(56) References Cited

U.S. PATENT DOCUMENTS

| 3,077,802 A | 2/1963 | Philip |
| 3,303,731 A | 2/1967 | Zawistowski |

(Continued)

FOREIGN PATENT DOCUMENTS

| CN | 107378635 A | 11/2017 |
| CN | 107716953 A | 2/2018 |
| CN | 207205989 U | 4/2018 |

OTHER PUBLICATIONS

PCT/US2020/015355, May 21, 2020, International Search Report and Written Opinion.

(Continued)

*Primary Examiner* — Miguel A Diaz
(74) *Attorney, Agent, or Firm* — Wolf, Greenfield & Sacks, P.C.

(57) ABSTRACT

Improvements in machining systems that utilize machining fluids comprising a supercritical fluid are described. Some systems may provide centralized distribution of a supercritical machining fluid and/or a lubricant to a plurality of machining tools in a machining facility. Other systems may allow for selective delivery of multiple machining fluids to a machine tool. For example, a supercritical machining fluid and a non-supercritical machining fluid may be selectively delivered to a machining tool as desired for a particular machining process.

15 Claims, 5 Drawing Sheets

(56) References Cited

U.S. PATENT DOCUMENTS

| | | | |
|---|---|---|---|
| 3,897,335 A * | 7/1975 | Brandt | C10M 175/04 210/774 |
| 4,961,325 A * | 10/1990 | Halvorson | F17C 7/04 62/48.1 |
| 5,733,174 A | 3/1998 | Bingham et al. | |
| 6,045,301 A | 4/2000 | Kammermeier et al. | |
| 7,316,363 B2 * | 1/2008 | Hume | B05B 1/14 239/132.5 |
| 7,414,015 B2 * | 8/2008 | Skerlos | C10M 111/04 508/491 |
| 10,007,246 B2 | 6/2018 | Grant | |
| 10,040,129 B2 | 8/2018 | Voss | |
| 10,052,694 B2 | 8/2018 | Musil et al. | |
| 2002/0081167 A1 * | 6/2002 | Sasanecki | B23Q 1/0018 137/884 |
| 2003/0226588 A1 * | 12/2003 | Olander | F17C 5/00 137/240 |
| 2005/0051233 A1 * | 3/2005 | Wodjenski | F17C 13/025 141/104 |
| 2005/0268938 A1 * | 12/2005 | Johnson | F17C 9/02 134/2 |
| 2006/0000358 A1 * | 1/2006 | Agrawal | F17C 9/00 95/273 |
| 2006/0222470 A1 | 10/2006 | Tchorny et al. | |
| 2006/0247139 A1 | 11/2006 | Skerlos et al. | |
| 2007/0125883 A1 | 6/2007 | Colter | |
| 2008/0256949 A1 * | 10/2008 | Wikstrom | F02M 26/24 60/599 |
| 2008/0293599 A1 | 11/2008 | Skerlos et al. | |
| 2009/0320655 A1 * | 12/2009 | Grant | B23C 5/28 29/564 |
| 2011/0113866 A1 | 5/2011 | Finlay | |
| 2012/0082518 A1 | 4/2012 | Woodruff et al. | |
| 2012/0237311 A1 * | 9/2012 | Dionne | B23Q 11/1061 409/135 |
| 2013/0008781 A1 * | 1/2013 | Kikuchi | C25B 1/245 204/247 |
| 2013/0213521 A1 * | 8/2013 | Isom | B65B 3/12 141/4 |
| 2020/0353545 A1 | 11/2020 | Hurtubise et al. | |

OTHER PUBLICATIONS

International Search Report and Written Opinion for International Application No. PCT/US2020/015355, dated May 21, 2020.

Clarens, Carbon dioxide based metal working fluids. Dissertation submitted in partial fulfillment of the requirements for the degree of Doctor of Philosophy (Environmental Engineering and Natural Resources and Environment) in the University of Michigan. 2008, 171 pages.

Mulyana et al., The influence of cryogenic supercritical carbon dioxide cooling on tool wear during machining high thermal conductivity steel. Journal of Cleaner Production. 2017;164:950-62.

Rahim et al., Experimental investigation of supercritical carbon dioxide ($SCCO_2$) performance as a sustainable cooling technique. Procedia CIRP. 2016;40:637-41.

Rahim et al., Study on pulse duration of supercritical carbon dioxide coolant delivery on machining perfoimance of AISI 1045. International Journal of Engineering and Technology. Dec. 2016;8(6):2646-53.

Stephenson et al., Rough turning Inconel 750 with supercritical CO2-based minimum quantity lubrication. Journal of Materials Processing Technology. 2014;214:673-80.

Tapoglou et al., Investigation of the influence of $CO_2$ cryogenic coolant application on tool wear. Procedia CIRP. 2017;63:745-9.

International Search Report and Written Opinion for International Application No. PCT/US2020/032059, dated Sep. 16, 2020.

Cai et al., Cooling/Lubrication Performance of Dry and Supercritical CO2-Based Minimum Quantity Lubrication in Peripheral Milling Ti-6A1-4V, International Journal of Precision Engineering and Manufacturing—Green Technology. Mar. 2021;8:405-21.

* cited by examiner

MACHINING SYSTEMS UTILIZING SUPERCRITICAL FLUIDS

FIELD

Disclosed embodiments are related to machining systems that utilize supercritical machining fluids.

BACKGROUND

Machining tools, such as milling systems, lathes, computer numerical control (CNC) systems, robotic drills, and/or machining centers may employ machining fluids such as metalworking fluids to provide cooling and/or lubrication during a cutting or forming process. The machining fluid may be delivered to an interface between a cutting tool and a workpiece during a cutting or forming process. In some applications, the machining fluid may be delivered externally, such as by routing the machining fluid through a series of pipes and to one or more nozzles that direct the machining fluid toward the cutting interface. In other applications, the machining fluid may be routed internally to the interface, such as through a tool holder and/or through a cutting tool (e.g., through one or more channels formed in a cutting tool).

Conventional machining fluids may comprise mixtures including a cooling fluid (such as air, water, liquid carbon dioxide, or liquid nitrogen) to cool a cutting zone and a lubricant (such as oil, a minimum quantity lubrication (MQL) fluid, or synthetic fluids) to lubricate the cutting zone during a cutting process. In some instances, a machining fluid only including an oil, emulsion, or a synthetic fluid may be suitable. In some applications supercritical fluids, such as supercritical carbon dioxide ($scCO_2$) have been utilized used as a portion of a machining fluid.

SUMMARY

In one embodiment, a machining system comprises a first machining fluid supply constructed and arranged to deliver a supercritical machining fluid and a second machining fluid supply constructed and arranged to deliver a second machining fluid. The system further comprises a first valve having a first inlet fluidly coupled to the first machining fluid supply, a second inlet fluidly coupled to the second machining fluid supply, and an outlet fluidly coupled to a machining tool. The first valve is movable between a first position in which the first valve is configured to deliver the supercritical machining fluid to the machining tool and a second position in which the first valve is configured to deliver the second machining fluid to the machining tool.

In another embodiment, a machining system comprises a lubricant reservoir fluidly coupled to a plurality of machining tools, and one or more pumps coupled to the lubricant reservoir and configured to deliver lubricant from the lubricant reservoir to each machining tool of the plurality of machining tools. The one or more pumps are configured to supply a predetermined flow rate of lubricant to the plurality of machining tools, and the lubricant is combined with a machining fluid at each machining tool of the plurality of machining tools.

In a further embodiment, a system for distributing a supercritical machining fluid comprises a storage tank constructed and arranged to store a liquid and having an outlet positioned adjacent a bottom portion of the storage tank, and a pressure booster fluidly coupled to the outlet. The pressure booster is constructed and arranged to receive the liquid from the first storage tank and increase the pressure of the liquid to a first pressure greater than a critical pressure of the liquid. The system further comprises a heater fluidly coupled to the pump and constructed and arranged to increase a temperature of the liquid to a first temperature greater than a critical temperature of the liquid. Upon increasing the pressure of the liquid to the first pressure and increasing the temperature of the liquid to the second pressure, the liquid transforms into a supercritical fluid. The system also includes a storage vessel fluidly coupled to the heater, and a distribution system fluidly coupled to the storage vessel. The storage vessel is constructed and arranged to receive the supercritical fluid and maintain the supercritical fluid at a pressure greater than the critical pressure of the liquid and a temperature greater than the critical temperature of the liquid, and the distribution system is constructed and arranged to deliver the supercritical fluid from the storage vessel to a plurality of machining tools.

In yet another embodiment, a method of detecting leaks in a machining system including a supercritical machining fluid comprises delivering a supercritical machining fluid to a machining tool, measuring a temperature of a portion of the machining tool, detecting a temperature drop greater than a predetermined temperature drop, and generating a leak indication signal in response to detection of the temperature drop greater than the predetermined temperature drop.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
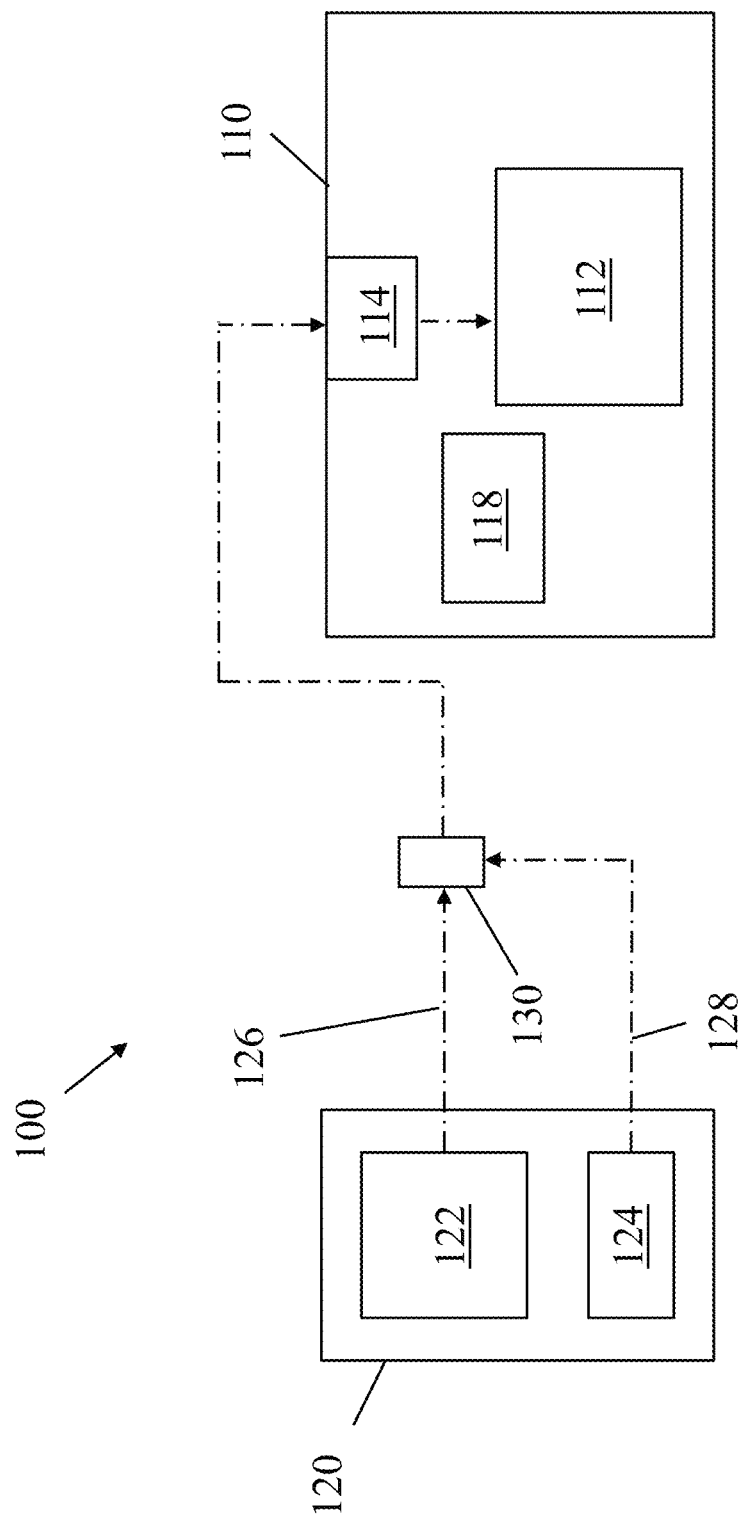
FIG. 1 is a schematic representation of a machining system utilizing a supercritical fluid, according to some embodiments.

Aspects described herein relate to improvements in machining systems that utilize machining fluids comprising a supercritical fluid, such as supercritical carbon dioxide ($scCO_2$) or supercritical nitrogen. The inventors have appreciated that supercritical machining fluids may provide numerous benefits compared to conventional machining fluids, such as water-based machining fluids, oil-based machining fluids (e.g., neat oils), minimum quantity lubrication (MQL) fluids, or synthetic machining fluids. As used herein, a supercritical fluid refers to a fluid that is maintained above its critical point (i.e., at a temperature above the critical temperature and at a pressure above the critical pressure). For example, the critical temperature and pressure for carbon dioxide are 31.1° C. and 72.8 atm, respectively, which are readily achievable in industrial applications. Above the critical point, distinct liquid and gas phases do not exist; instead, supercritical fluids exhibit characteristics of both liquids and gases. For example, supercritical fluids may exhibit the flow and expansion behaviors of gasses while also being able to dissolve materials like a liquid. In machining applications, rapidly expanding supercritical machining fluids may provide better cooling and/or more efficient heat transfer, may provide for better mixing with lubricants or dissolution of lubricants, and/or allow for the use of smaller amounts of lubricants compared to conventional water-based machining fluids. Moreover, as described in more detail below, in some instances, rapidly expanding supercritical machining fluids comprising dissolved lubricants may precipitate small lubricant droplets travelling at high speed, which may provide superior lubrication relative to conventional machining fluids.

Although some of the above-described properties of supercritical fluids have been recognized to provide a number of advantages in machining applications, the inventors have also recognized and appreciated that some aspects of the designs of conventional machining systems may not be well suited for use with supercritical fluids. In particular, the different properties and/or behaviors of supercritical fluids compared to conventional machining fluids may necessitate different approaches to the design of machining systems in order to accommodate the supercritical fluids. For example, the inventors have recognized advantages associated with systems that can deliver a fluid to a machining tool below its critical pressure and/or critical temperature, and subsequently raise the pressure and/or temperature of the fluid at the machining tool to generate a supercritical machining fluid. In some applications, a fluid may be stored above its critical pressure (e.g., in a storage tank associated with a machining tool and or in a centralized storage system that is configured to distribute the high pressure fluid to multiple machining tools), and the fluid may be heated to a temperature above its critical temperature at each machining tool when the supercritical machining fluid is required for a cutting process. In other applications, a supercritical machining fluid may be stored in one or more storage tanks specifically designed to store the supercritical machining fluid and maintain the fluid above the critical point during storage before it is needed during a cutting operation. As described in more detail below, in some embodiments, a supercritical fluid may be prepared and stored in a supercritical state and may be distributed to multiple machining tools through a centralized delivery system.

Moreover, depending on the particular embodiment, the temperature of a supercritical machining fluid may be adjusted as desired for different types of supercritical fluids and/or as appropriate for thermal management of a particular cutting process. For example, for systems utilizing $scCO_2$, the temperature may be maintained above 100° C. In some instances, maintaining warmer temperatures may be advantageous, for example to provide small, high velocity particles without overcooling. For example, maintaining a temperature substantially higher than the critical temperature of the supercritical fluid may be advantageous in some cutting processes.

Additionally, the inventors have recognized and appreciated that systems utilizing a supercritical machining fluid may require various components such as pumps, valves, seals, and/or other plumbing arrangements that are selected to be compatible with the supercritical machining fluid. For example, such components may be used in connection with systems to deliver a supercritical machining fluid to a machining tool (such as from a centralized distribution system, and/or from supercritical fluid system associated with a particular machining tool. Moreover, the inventors have recognized and appreciated that many components within machining tools may not be compatible with supercritical fluids. For example, many seals used in conventional machining tools are formed from materials that are readily solubilized by supercritical machining fluids, which would lead to degradation and/or failure of the machining system. Accordingly, some aspects described herein relate to materials (e.g., for sealing arrangements) that are suitable for use with supercritical machining fluids, as described in more detail below.

While various embodiments described herein refer to supercritical machining fluids, it should be understood that the current disclosure is not limited supercritical machining fluids that are maintained in their supercritical state throughout the entirety of a machining process. In particular, in some embodiments, the machining fluid may start in its supercritical state but may fall below the critical temperature and/or pressure during the machining process. The inventors have recognized and appreciated that many of the benefits described herein associated with the supercritical state may still be maintained if the machining fluid drops below the critical point. For example, in some applications, mixing a lubricant into a supercritical machining fluid may advantageously result in the lubricant dispersing into small droplets upon the temperature and/or pressure of the supercritical machining fluid falling below their respective critical values such that the machining fluid loses its supercritical character. In particular, the inventors have appreciated that while the machining fluid is in the supercritical state, the lubricant may be fully dissolved in the matching fluid (i.e., the lubricant may be fully soluble in the supercritical fluid) such that such droplets may not exist while the machining fluid is in a supercritical state. Accordingly, in some embodiments, droplets of lubricant may be formed only upon the machining fluid transitioning out of the supercritical state.

In some instances, a supercritical machining fluid may undergo rapid expansion as it is delivered into an open environment, such as when the supercritical fluid is delivered out of a nozzle or orifice of a cutting tool or tool holder at a cutting interface. The inventors have appreciated that this expansion of the supercritical fluid may aid in precipitating smaller and more uniformly sized droplets of lubricant compared to what is achievable with conventional machining fluids. Accordingly, in some applications, the supercritical machining fluids described herein may no longer be in a supercritical state at points in a machining process at which a part is being cut, cooled, and/or lubricated (e.g., within a spindle of a machining tool and/or at a cutting interface), but the use of the supercritical machining fluid may still provide multiple benefits compared to conventional machining fluids, particularly when the supercritical machining fluid is delivered as close to a cutting zone as practicable.

According to some aspects, systems described herein may provide for centralized preparation and storage of a supercritical fluid, and distribution of the supercritical machining fluid to one or more machining tools located within a machining facility (or other suitable environment). In one embodiment utilizing a supercritical machining fluid comprising $scCO_2$, the $scCO_2$ may be prepared and centrally stored, and the $scCO_2$ may be distributed to various machining tools within the machining facility as needed. For example, the $scCO_2$ may be prepared by pumping liquid $CO_2$ out of a bulk storage tank via a pressure booster (e.g., a pump such as a cryogenic pump, a gas blanket, or a gas booster). The pressure booster may raise the pressure of the $CO_2$ above the critical pressure. The high pressure $CO_2$ may then be directed through a heater such as an electric vaporizer that heats the $CO_2$ to a temperature greater than the critical temperature, thereby converting the $CO_2$ to its supercritical state. The $scCO_2$ is subsequently transferred to a high pressure, large volume storage vessel constructed and arranged to maintain the $scCO_2$ in the supercritical state. For example, the storage vessel may be suitably insulated to avoid heat loss (which could result in the temperature falling below the critical temperature). Moreover, in some embodiments, the storage vessel may include an active temperature control system including one or more heating elements, temperature sensors, and controllers configured to maintain the $scCO_2$ above the critical temperature. The $scCO_2$ may be stored in the storage vessels until machining fluid is required within the machining facility (e.g., at one or more machining tools within the machining facility), at which time the $scCO_2$ may be drawn from the storage vessel and distributed to the machining facility as needed.

In some embodiments, the storage vessel may comprise one or more large storage tanks, and/or a plurality of smaller storage tanks (e.g., cylinders) coupled to one another to form a large storage volume. Alternatively, or additionally, some storage vessels may be configured to store the machining fluid at a temperature and/or pressure below the critical temperature and/or pressure, respectively. In such embodiments, machining fluid stored in the storage vessel(s) may pass through one or more additional heaters and/or pressure boosters before being distributed to the machining tools to transform the machining fluid back into its supercritical state. Moreover, some systems may employ multiple storage vessels that may be configured to distribute the $scCO_2$ to a subset of the machining tools within a machining facility. In this manner, the multiple storage vessels may be arranged as distributed cells configured for distribution to certain portions of a machining facility or to a certain subset of machining tools within the machining facility.

The inventors have further recognized and appreciated numerous advantages associated with systems that provide centralized distribution of lubricant to multiple machining tools around a machining facility. In particular, conventional lubricant delivery arrangements typically utilize individual pumps associated with each machining tool to deliver a desired volumetric flow rate of lubricant to the machining tool. The inventors have appreciated that such arrangements can lead to significant costs. For instance, in some applications, a high pressure lubricant dosing pump may constitute a considerable portion of the total cost of a machining tool, and the individual pumps may lead to substantial maintenance and repair costs, especially in machining facilities including a large number of machining tools. Accordingly, some aspects described herein relate to centralized distribution systems that can deliver a required volumetric flow rate of lubricant to multiple machining tools from a central lubricant source. The inventors have appreciated that such arrangements may provide for simpler and cheaper lubricant delivery compared to conventional systems, and may provide for more robust systems requiring less maintenance and repair. Moreover, such centralized lubricant delivery arrangements may allow for substantially larger lubricant reservoirs compared to a reservoir that can be installed on an individual machine, which lay allow for longer run times before the lubricant must be changed or refilled.

In one embodiment, a lubricant distribution system includes a high pressure lubricant pump that is constructed and arranged to distribute a metered network of lubricant throughout a machining facility, for example to deliver lubricant to up to fifty separate machining tools. Moreover, the volumetric flow rate of lubricant distributed to each machining tool may be independently adjustable to provide the required amount of lubricant for a particular machining process. In some embodiments, the systems described herein may be configured to deliver natural straight oils, emulsion concentrates, synthetic oil lubricants, and/or other lubricant formulations soluble in a supercritical fluid (e.g., $scCO_2$) may be used, as the current disclosure is not limited to any particular lubricant distributed by a lubricant distribution system. In some embodiments, at each machining tool in a machining facility, the MQL fluid (or other suitable lubricant) may be combined with a supercritical fluid and may also be delivered to the machining tools (e.g., from a centralized source, as discussed above, or from a supercritical fluid generation system associated with a particular machining tool) to form a supercritical machining fluid that is subsequently delivered to a cutting interface of the tool. While some embodiments of lubricant distributions systems are described in connection with systems utilizing supercritical machining fluids, it should be understood that the lubricant distribution systems also may be used in applications utilizing more conventional (i.e., non-supercritical) machining fluids.

In addition to the above, the inventors have recognized and appreciated that delivery of supercritical machining fluid to a machining tool may present a number of challenges that are not present in conventional machining systems utilizing water-based machining fluids. In particular, in systems including rotary machining tools (e.g., CNC machines, lathes, mills, etc.), the machining fluid may be required to pass through a rotary union of the tool before reaching a cutting interface. Due to the high pressures and gas-like behavior associated with supercritical fluids, rotary unions which may be used in the systems described herein may need to be sealed more tightly compared to systems utilizing only conventional machining fluids. In some applications, rotary unions used with supercritical machining fluids may be designed with smaller diameters compared to systems using non-supercritical fluids.

Additionally, rotary unions in the systems described herein utilizing supercritical machining fluids may be designed to accommodate repeated pressurization and depressurization cycles associated with tool changes. For example, the rotary unions may comprise spring arrangements within a rotary joint configured to avoid closure of the rotary joint when the joint is pressurized by the pressure of the supercritical machining fluid. Some embodiments may comprise reclosing mechanisms for bearingless rotary joints that are configured to provide lubrication to the rotary joint during a tool change. In particular, in contrast to rotary joints utilizing conventional machining fluids that can lubricate the seals during normal operation of the rotary joint, the high pressures associated with supercritical fluids may prevent lubricant from penetrating the seals of the rotary joint. Accordingly, in some embodiments, the seal of a rotary joint may separate during a depressurization associated with a tool change, and the separation may allow a thin film of lubricant to be deposited onto the seal to provide lubrication.

Moreover, as described in more detail below, in some embodiments, the materials used the various sealing components may be selected to provide compatibility with the supercritical machining fluid (e.g., to avoid undesirable solubility of the seal material in the supercritical fluid).

As noted above, while various embodiments are described herein that utilize centralized distribution of a supercritical machining fluid and/or lubricant, it should be understood that the current disclosure is not limited in this regard. For example, some embodiments may include individual systems for supplying a supercritical machining fluid to an associated machining tool. For instance, a supercritical machining fluid system may be coupled to a machining tool (such as a CNC machine), and the supercritical machining fluid system may deliver the machining fluid and/or lubricant to the tool as need.

According to some aspects, machining systems designed for use with a supercritical machining fluid (e.g., $scCO_2$) may also be compatible with conventional water and oil based machining fluids. Accordingly, unlike other conventional systems based on cryogenic and/or gas-based machine working fluids, the systems described herein may allow for a machining tool operator to easily switch between the supercritical machining fluid and water and oil-based machining fluids as desired, including during a single machining process and/or between machining processes. In particular, the inventors have appreciated that supercritical machining fluids may have a density approaching the density of water (e.g., about 80% of the density of water), and lubricants such as oils may be soluble in the supercritical machining fluids. As a result, the supercritical machining fluids may be able to flow through the same spindle arrangements that are used for water-based machining fluids. In contrast, water based machining fluids may not be compatible with other non-supercritical machining fluids such as cryogenic fluids (e.g., cryogenic $CO_2$ or liquid nitrogen), which may require specialized arrangements that may not be suitable for water based fluids. Consequently, systems based on such other non-supercritical machining fluids would require substantial modification to provide compatibility with water based fluids. By contrast, in the systems described herein, selection of a desired machining fluid (e.g., water-based or supercritical) may be made on a day-to-day, part-to-part, and/or tool-to-tool basis without substantial modification to the machining tool, thereby providing the operator flexibility to select an appropriate machining fluid for a particular machining process.

In some embodiments, a machining tool may include a valve arrangement to facilitate switching between the supercritical machining fluid and the conventional (e.g., water based) machining fluid. For example, the valve arrangement may be positioned upstream from a rotary union, turret, or other suitable connection to a cutting portion of a machining tool such as a spindle of a machining tool. The machining fluid may flow through the valve arrangement and the cutting portion of the tool, and may ultimately be directed towards a cutting interface. The valve arrangement may include a three-way fluid selection valve, such as a pneumatically actuated ball valve, and the ball valve may include an orifice large enough so as to not restrict the volumetric flow rate of the water or oil-based machining fluid, even when under high pressure. Moreover, the valve arrangement may be configured within a machining system such that the ball valve does not form an ultimate restriction point for the supercritical machining fluid in order to avoid undesirable expansion of the supercritical fluid within the system.

In some embodiments, the valve arrangement may also include a three-way valve positioned between a supply of the supercritical fluid (e.g., from a central distribution source) and the fluid selection valve. This three-way valve may allow for selective venting of the supercritical machining fluid to reduce or purge the pressure within the machining tool, such as during tool changes or when a conventional water or oil-based machining fluid is in use. In some applications, the three-way valve may be a solenoid valve operatively coupled to a controller of the associated machining tool, such as a controller of a CNC machine. The controller may send electronic signals to the three way valve to selectively control the flow of the supercritical fluid to the machining tool, such as in response to a signal from the controller that additional coolant is required at the cutting interface. In some instances, the valve arrangement may further include one or more check valves, such as a check valve positioned between a supply of the conventional water or oil-based machining fluid and the machining fluid selection valve. Such check valves may further aid in facilitating simple and rapid transitions between use of supercritical machining fluids and conventional water or oil-based machining fluids in the machining tool.

Moreover, in some applications, a valve arrangement may further include a lubricant inlet through which a separate lubricant (e.g., an MQL lubricant) may be introduced and delivered to the machining tool (e.g., before a rotary union, turret, or other suitable connection to the machining tool). For example, in one embodiment including a fluid selection valve as discussed above, the lubricant inlet may be positioned downstream relative to the fluid selection valve such that the lubricant (e.g., an MQL lubricant) can be selected as an alternative to either a supercritical machining fluid or a water or oil-based machining fluid, as desired.

The inventors have further recognized and appreciated advantages associated with monitoring the pressure of a supercritical machining fluid that is delivered to a rotary union, turret, or other suitable connection to a cutting component of a machining tool (e.g., a spindle). In particular, due to the high pressures associated with supercritical fluids, monitoring of the pressure may be useful for ensuring that the pressure behind the spindle is purged before performing operations such as tool changes, as well as for monitoring the pressure of the supercritical machining fluid during a machining operation to ensure that the pressure is maintained within a desired operating range. Such pressure monitoring is not required in conventional machining systems utilizing non-supercritical machining fluids; however, when using supercritical fluids, pressure monitoring may be employed, for example, to improve machine safety, to detect leaks, and/or to ensure that a supercritical state is achieved. Moreover, in some instances, different cooling and/or flow characteristics may be achieved by controlling the pressure of the supercritical fluid, which can impact a machining process.

In some embodiments, a pressure transducer associated with a spindle of a machining tool may be installed as a component of a valve assembly of a machining tool. For example, in connection with the valve assemblies discussed above, a pressure transducer may be installed between the three-way valve associated with the supercritical fluid source and the fluid selection valve. In other embodiments, such as embodiments that do not include a fluid selection valve, the pressure transducer may be installed between a three-way valve associated with the supercritical fluid source and the rotary union (or other suitable connection) of the machining tool. Alternatively or additionally, in some embodiments, one or more pressure transducers may be provided downstream of the rotary union, such as within a portion of a machining tool such as a spindle.

In certain embodiments, the pressure transducer may be operatively coupled to a controller, such as a controller of a CNC machine (or other suitable machining tool). The controller of the CNC machine may be configured to check that the pressure upstream of the spindle (i.e., upstream of the rotary union) has been purged prior to proceeding with a tool change operation. If purging of the pressure is required, the controller may communicate with a three-way valve associated with the supercritical fluid source, as discussed previously.

According to some aspects, a machining tool may be configured to monitor the temperature of one or more components of a machining tool, such as a spindle of a rotary machining tool. The inventors have recognized and appreciated that the gas-like behavior of supercritical fluids, and specifically, the tendency for supercritical fluids to expand rapidly when exposed to an open environment and/or when transitioning from smaller volume regions to larger volume regions, may be utilized to detect problems with the machining tool, such as leaks of the supercritical machining fluid. In particular, the rapid expansion of the supercritical fluid results in a rapid cooling of the supercritical fluid, which in turn causes cooling of the components of the machining systems that come into contact with the supercritical fluid. Accordingly, in some embodiments, temperature monitoring may be used to detect drops in the temperature of one or more components of the machining tool caused by leaking supercritical machining fluid. In this manner, leaks in the machining tool may be detected and repaired before substantial damage or failure is suffered by the machining tool, for example, due to freezing of one or more components of the machining tool. In particular, components that may be susceptible to such damage or failure, include, but are not limited to, bearings in a spindle of a machining tool, drive motors, tool holders, connections between a tool holder and spindle, and/or cutting tools held by a tool holder.

In some embodiments, the systems described herein may utilize existing temperature sensors included in a machining tool such as a CNC machine to perform the above-described leak detection. In particular, CNC machines often include thermocouples, resistance temperature detectors, or other suitable temperature sensors to monitor the temperature of the spindle (e.g., to monitor for overheating of the spindle). However, the inventors have appreciated that these temperature sensors may also be configured to monitor for temperature drops for leak detection. For example, a controller of the CNC machine may be configured to detect a leak based on a predetermined drop in the temperature of the spindle, such as a temperature drop from a normal operating temperature, which may be room temperature or above, to a temperature of about 0° C. or below. Accordingly, in some embodiments, a predetermined temperature drop may be between about 20° C. to about 40° C. from the normal operating temperature. In some embodiments, a leak may be detected based on a predetermined rate of change of the temperature. Upon detection of the leak, the CNC machine may sound an alarm and discontinue a cutting operation, including delivery of the supercritical fluid to the spindle. In this manner, the CNC machine may be protected from further damage that might otherwise result from the leak.

While the above-described embodiments utilize temperature monitoring within a machine tool to detect leaks of a supercritical fluid, it should be understood that temperature monitoring may be similarly employed in other parts of a system to detect leaks of the supercritical fluid. For example, in connection with the centralized supercritical fluid distribution systems described above, the temperature of one or more components of the distribution system, such as storage vessels and/or pipes, may be monitored to detect leaks of the supercritical fluid. Similar to the embodiments described above, the systems may be configured to detect of a temperature drop of the various components greater than a predetermined temperature drop, which may correspond to a rapid expansion and cooling of the supercritical fluid in the event of the leak. Upon detection of the leak, the system may be configured to terminate flow of the supercritical fluid to the affected components.

As noted above, the inventors have recognized and appreciated that systems utilizing supercritical machining fluids may necessitate the selection of materials for various components of the machining system to provide compatibility with the supercritical fluid. For example, in some applications, it may be beneficial to utilize stainless steel tubing to route a supercritical machining fluid from a storage vessel (e.g., a centralized storage vessel as discussed above) to a rotary union (or other suitable connection) where the machining fluid is delivered to a cutting portion of machining tool (e.g., a spindle of a rotary machining tool). The dimensions of the stainless steel tubing may be selected based on the desired operating pressure ranges associated with the supercritical machining fluid delivery system. For example, in one embodiment, stainless steel tubing having an outer diameter between about 0.1 inches and about 0.5 inches (e.g., 0.25 inches), and a wall thickness between about 0.02 inches and about 0.05 inches (e.g., about 0.035 inches) may be suitable. However, it should be understood that that the current disclosure is not limited to any particular dimensions for the stainless steel tubing to deliver the supercritical machining fluid. Additionally, other materials for the tubing that may be suitable include, but are not limited to steel alloys, brass, titanium, Hastelloy, aluminum, and/or high pressure hoses.

Moreover, in some applications, some portions of a system (such as within a CNC system) may necessitate the use of flexible tubing to route the supercritical machining fluid to the cutting interface. In such systems, the flexible tubing may be selected based on compatibility with the supercritical machining fluid as well as based on the required operating temperature and pressure ranges. For example, in one embodiment utilizing a $scCO_2$-based machining fluid, suitable tubing materials include, but are not limited to, Parker Paraflex 520N-4 hydraulic hoses, PTFE lined braided stainless steel hoses such as Swagelok B-Series, convoluted stainless steel core hoses such as Swaglok FX Series, polyamide core hoses such as Fluke DH400, and nylon core hoses such as Swagelok 7R series.

In addition to the above, the various seals, O-rings, and joints used in the systems described herein that may come into contact with the supercritical machining fluid may be selected based on the operating temperature and pressure ranges associated with the supercritical fluid as well as to provide compatibility with the supercritical fluid. For example, operating pressures may be between about 100 and 140 bar, and in some instances, up to about 200 bar, 300 bar, 400 bar or more, and operating temperatures may be between about 20° C. and about 100° C. In some embodiments, suitable materials for seals and O-rings that can operate in these pressure and temperature ranges and also provide compatibility with supercritical fluids such as $scCO_2$ include, but are not limited to, Kalrez 0090, hard durometer Viton, Viton encapsulated with fluorinated ethylene propylene (FEP), and polytetrafluoroethylene (PTFE). In some applications, it may be beneficial to select highest durometer available of a seal or O-ring formed from a suitable material. Moreover, joints that may be suitable for connecting various portions of the systems described herein include, but are not limited to, hydraulic joints such as National Pipe Thread (NPT), British Standard Pipe (BSP and/or BSPP), Joint Industrial Council (JIC), and/or other compression fittings rated to greater than or equal to 200 bar.

Moreover, while some embodiments described herein include a lubricant (such as one or more oils, a metalworking fluid emulsion concentrate, and/or an MQL fluid) mixed with a supercritical fluid to form a supercritical machining fluid, it should be understood that the current disclosure is not limited to machining fluids including a lubricant. For example, in some applications, the supercritical fluid alone may provide sufficient cooling and/or lubrication during a cutting process. In other applications, a coolant fluid (e.g., water) may be added to a supercritical machining fluid to add mass and/or additional heat transfer capability to the machining fluid. Accordingly, it should be understood that a supercritical machining fluid may refer to a supercritical fluid with, or without, additional components such as lubricants or coolants.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic representation of a machining system 100 utilizing a supercritical machining fluid. The system 100 includes a machining tool 110 (e.g., a CNC machine, a lathe and/or turret lathe) including a cutting interface 112 where a cutting or forming operation may be performed. For example, the cutting interface may include a rotating spindle to which a cutting tool may be attached. Some systems, such as turret lathe systems, may include multiple cutting tools that may be selected based on a particular desired cutting operation. The machining tool 110 further incudes a coupling 114, such as a rotary union, that couples the cutting interface to a machining fluid system 120.

The machining fluid system 120 includes a machining fluid supply 122 and a lubricant supply 124. In some embodiments, the machining fluid supply may be configured to deliver a supercritical machining fluid (e.g., scCO$_2$) to the machining tool 110, however, embodiments configured for conventional machining fluids (i.e., non-supercritical fluids) also may be suitable. The machining fluid and lubricant are delivered to the coupling 114 via supply lines 126 and 128, respectively. Moreover, the machining tool 110 includes a controller 118 configured to control various aspects of the operation of the machining tool, such as the operation of the cutting tool during a cutting operation. The controller 118 is also operatively coupled to a valve arrangement 130 such that the controller may control the delivery of supercritical fluid and/or lubricant to the machining tool 110.

Depending on the particular embodiment, the machining fluid source 120 may be a standalone system that may be coupled to an individual cutting tool to deliver the supercritical machining fluid to the cutting interface 112 during the cutting operation, or it may be a centralized distribution system configured to deliver machining fluid to multiple cutting tools within a machining or cutting center. Similarly, the lubricant source 124 may be a standalone system coupled to an individual machining tool, or the lubricant source may be a centralized lubricant distribution system configured to deliver lubricant to multiple machining tools within a machining facility.

Moreover, it should be understood that the current disclosure is not limited to any particular type of machining tool 110. For example, the tool could include a CNC machine, a lathe, a turret lathe, a mill, a robotic drill, or any other suitable machining system.

Figure 2:
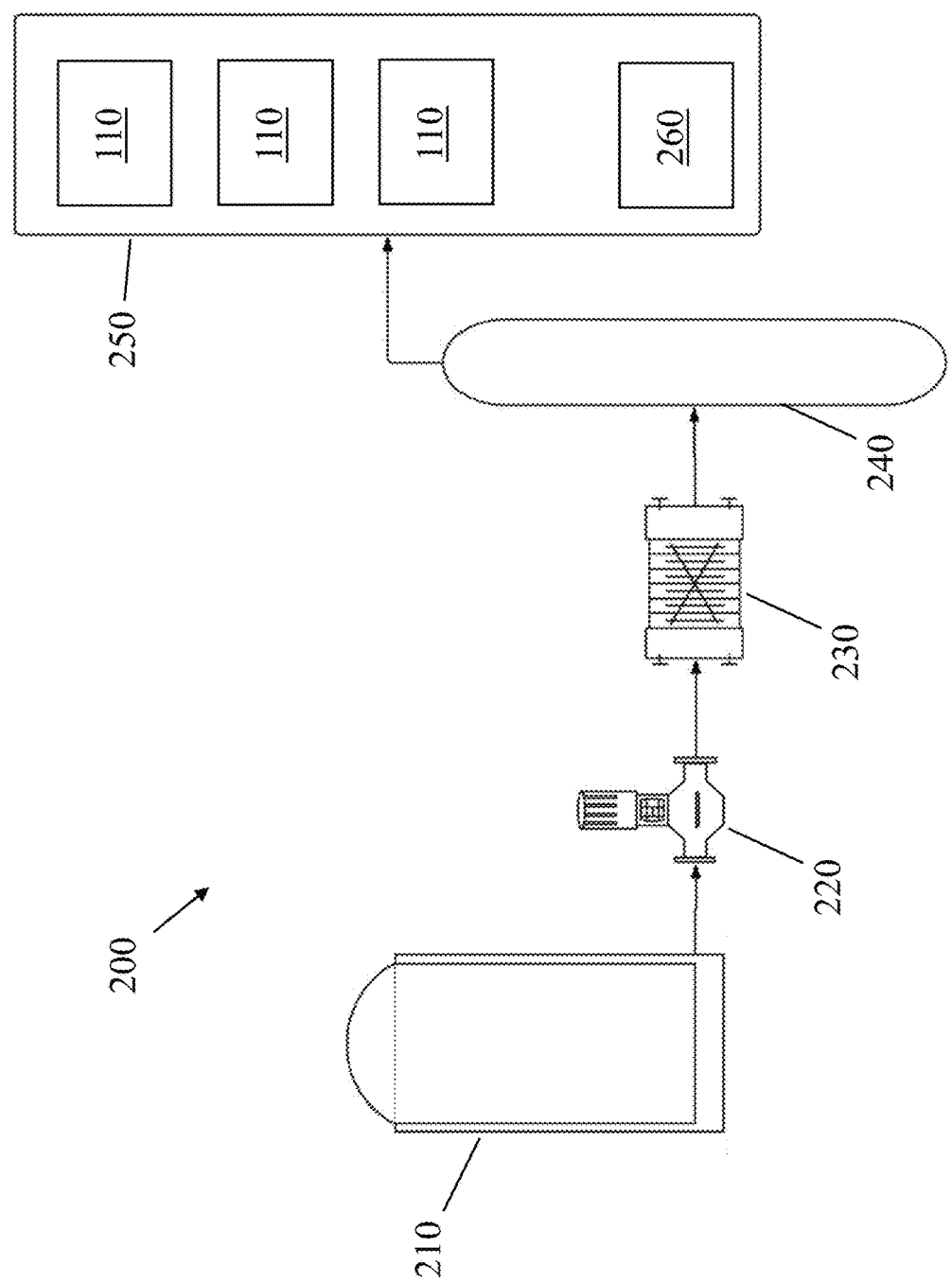
FIG. 2 is a schematic representation of a centralized supercritical machining fluid distribution system, according to some embodiments.

Referring now to FIG. 2, one embodiment of a system 200 for preparing and distributing a scCO$_2$-based supercritical machining fluid is described in more detail. The system includes a storage tank 210 configured to contain liquid CO$_2$. For example the storage tank 210 may be a vacuum jacketed, vertical tank in which the liquid CO$_2$ is maintained at a pressure of approximately 20 bar and a temperature of about −18° C. Liquid CO$_2$ is supplied from the storage tank 210 to one or more pumps 220 such as cryogenic pumps. In some embodiments, the liquid CO$_2$ may be drawn from the bottom of storage tank 210. In this manner, the system may utilizes a head pressure of the liquid column in the storage tank to maintain a minimum net positive suction head (NPSH) at the suction port of the pump 220. The pump is configured to compress the liquid CO$_2$ and increase the pressure of the liquid CO$_2$ to a pressure above the critical pressure, e.g., up to about 200 bar. The high-pressure liquid CO$_2$ is then directed through a heater 230, such as an electric vaporizer, that heats the CO$_2$ to a temperature above its critical temperature (i.e., greater than 31° C.). By heating the fluid to above its critical temperature, the high-pressure liquid CO$_2$ is converted to its supercritical state (scCO$_2$). The scCO$_2$ is then transferred to a high pressure, large volume storage vessel 240, which may include one or more heating elements, insulation, and closed looped controls configured to maintain the temperature to ensure that scCO$_2$ remains above the critical temperature. When needed for machining operations, the scCO$_2$ is subsequently distributed from the storage vessel 240 and into a machining facility 250 including a plurality of machining tools 110, and the scCO$_2$ may be routed to the individual machining tools.

While a single storage tank 210 is shown in FIG. 2, it should be understood that other arrangements may be suitable. For example, as noted above, some embodiments may employ a plurality of smaller storage tanks (e.g., cylinders) coupled to one another to form a single larger storage volume. In some embodiments, such storage tanks may be located within the machining facility 250. Alternatively or additionally, some embodiments may employ multiple storage tanks and/or pluralities of smaller storage tanks arranged to form distribution cells that are configured to distribute the scCO$_2$ to different portions of a machining facility and/or to different subsets of machining tools within a machining facility.

Moreover, in some embodiments, the system 200 may further include a centralized lubricant distribution system 260. As discussed above, the lubricant distribution system may be constructed and arranged to distribute lubricant (e.g., MQL lubricant) to multiple machining tools 110, where the lubricant may be mixed with the scCO$_2$ machining fluid. Alternatively, each machining tool may be provided with a separate lubricant source that is coupled to a supply of scCO$_2$ from the system 200.

In the depicted embodiment, the scCO$_2$ is prepared and stored outside of the machining facility 250 and distributed to machining tools 110 located within the machining facility 250. However, embodiments in which some or all of the components of the system 200 are located within the machining facility 250 are also contemplated. For example, in one embodiment, the storage tank 210 may be located outside of the machining facility, while the pump 220, heater 230, and storage vessel 240 may be located within the machining facility. Moreover, while three machining tools 110 are depicted in the figure, it should be understood that the centralized distribution systems described herein may be used with any suitable number of machining tools.

Figure 3:
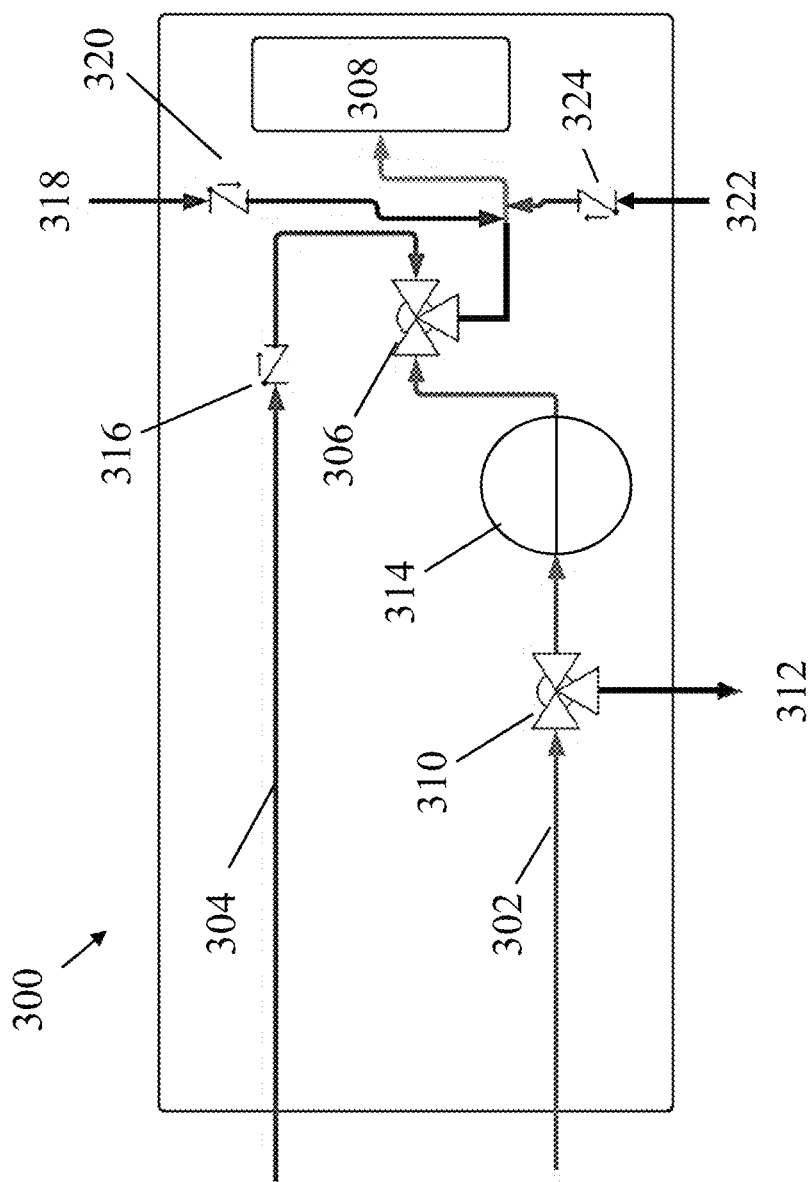
FIG. 3 is a schematic representation of a valve assembly, according to some embodiments.

FIG. 3 depicts a schematic flow chart illustrating the operation of a valve arrangement 300, according to some embodiments. The valve arrangement 300 may provide for switching between a supercritical machining fluid and a conventional (non-supercritical) machining fluid as may be required for different matching operations. The system includes a supercritical fluid supply 302 and a non-supercritical fluid supply 304, which are each routed to a first three-way valve 306 configured to selectively permit flow of the desired machining fluid to a machining tool 308. Depending on the particular embodiment, the first three way valve may be a manual valve or an automated valve, such as a pneumatically controlled valve.

A second three-way valve 310 is positioned between the supercritical fluid supply 302 and the first three way valve 306. The second three-way valve 312 may be configured to allow for routing the supercritical fluid to an exhaust 312, such as to purge pressure in the machining tool 308 during a tool change. In some embodiments, the second three-way valve may be a solenoid valve, though other types of valves may be suitable. A pressure sensor 314 is positioned between the first three-way valve 306 and second three-way valves 310 to monitor pressure behind the machining tool. In some applications, one or more operations of the machining tool may be controlled by a controller on the machining tool based on the measured pressure. For example, the machining tool may be configured to shut down a cutting operation and purge the pressure (via the second three-way valve) in the event that the pressure increases beyond a predetermined level. Moreover, flow of the non-supercritical fluid to the first three-way valve 306 may be controlled via a valve 316 (such as a check valve) associated with the non-supercritical fluid supply 304.

In some embodiments, the valve arrangement may be further configured to supply a lubricant to a machining fluid from a lubricant supply 318, and the flow of the lubricant may be controlled via a valve 320, such as a check valve, associated with the lubricant supply. Similarly, the valve arrangement may include an additive supply 322 configured to supply additives to the machining fluid, such as compressed air, and valve 324 may control delivery of the additive. In some instances, the lubricant supply and compressed air supply may be employed to provide a third machining fluid option (i.e., an air-dispersed lubricant such as an MQL lubricant).

While the embodiment described above is configured to selectively deliver a supercritical fluid and a non-supercritical fluid, it should be understood that other arrangements may be suitable. For instance, some embodiments may comprise supplies of two different supercritical fluids (e.g., $scCO_2$ pre-mixed with different lubricants), and the three way valve may be employed to selectively deliver one of the supercritical fluids. Moreover, while the valve arrangement is depicted as being outside of a machine tool, it should be understood that the current disclosure is not limited in this regard, and that some embodiments may include a valve arrangement positioned within a machine tool to permit selection of an appropriate machining fluid from a plurality of machining fluids delivered to the machining tool.

Figure 4:
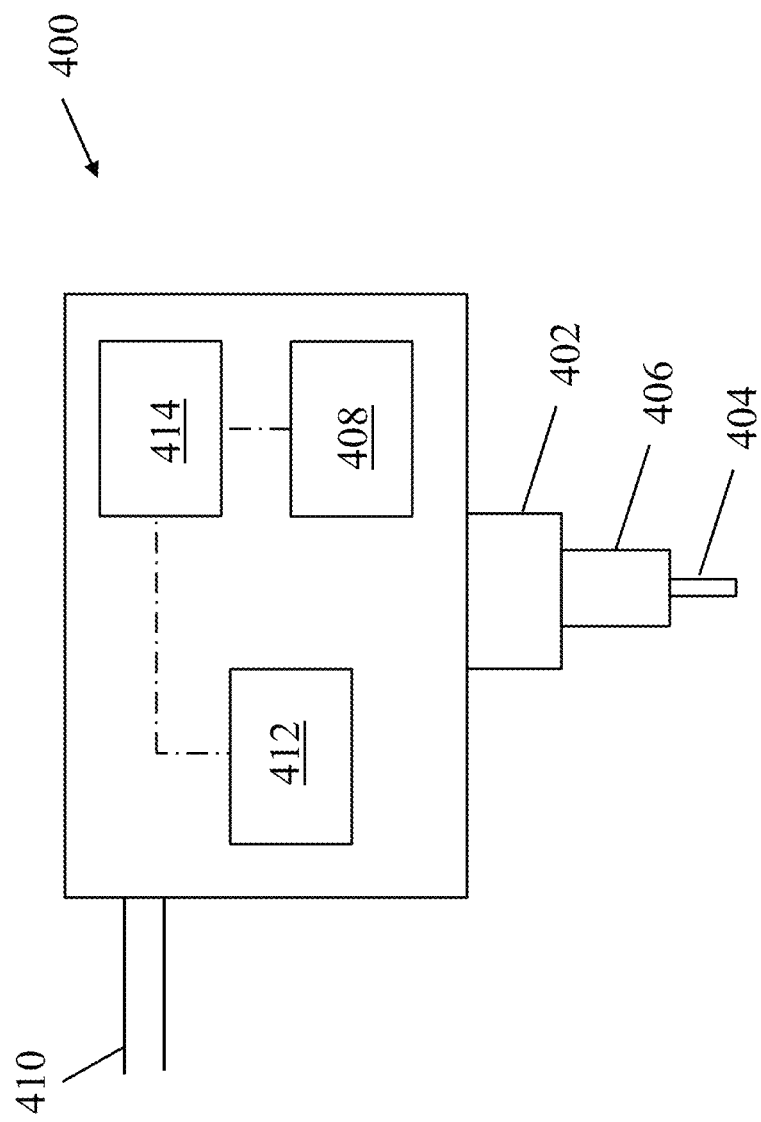
FIG. 4 is a schematic representation of a machining tool including temperature monitoring, according to some embodiments.

FIG. 4 is a schematic representation of one embodiment of machining tool 400 that includes temperature monitoring configured to detect leaks of a supercritical machining fluid. In particular, the machining tool 400 includes a spindle 402 to which to which a cutting tool 404 is attached via a toolholder 406. The machining tool 400 includes one or more drive motors 408 configured to drive rotation of the cutting tool 404 during a cutting operation. In the depicted embodiment, a supercritical machining fluid may be supplied to the matching tool via a supercritical fluid supply 410. The supercritical fluid may be delivered to a cutting interface in any suitable manner, such as through the machining tool 400 including through the spindle 402 and toolholder 406.

One or more temperature sensors 412 are provided on the machining tool, and the temperature sensors are configured to monitor the temperature of one or more components of the machining tool 400, including a temperature of the spindle 402. The temperature sensors 412 are connected to a controller 414, and the controller may be configured to detect a leak of the supercritical fluid based on a predetermined drop in a temperature measured by the temperature sensors. As discussed above, supercritical fluids may rapidly cool when they expand, which may occur if the supercritical fluid is undesirably leaking within the machine tool. In some embodiments, a temperature drop corresponding to a detected leak may be a drop in the operating temperature of the cutting machine to a temperature of 0° C. or below. Upon detecting a leak condition, the controller may shut down operation of the cutting machine, for example, my stopping the drive motors 408 and/or by discontinuing delivery of the supercritical fluid via the supercritical fluid supply 410. In other embodiments, the controller may be configured to switch the machining fluid to an aqueous machining fluid upon detecting a leak. In this manner, the various components of the machining tool, such as the spindle and any associated spindle bearing, the drive motors, and/or the cutting tool may be protected from further damage that might otherwise result from the leak.

Figure 5:
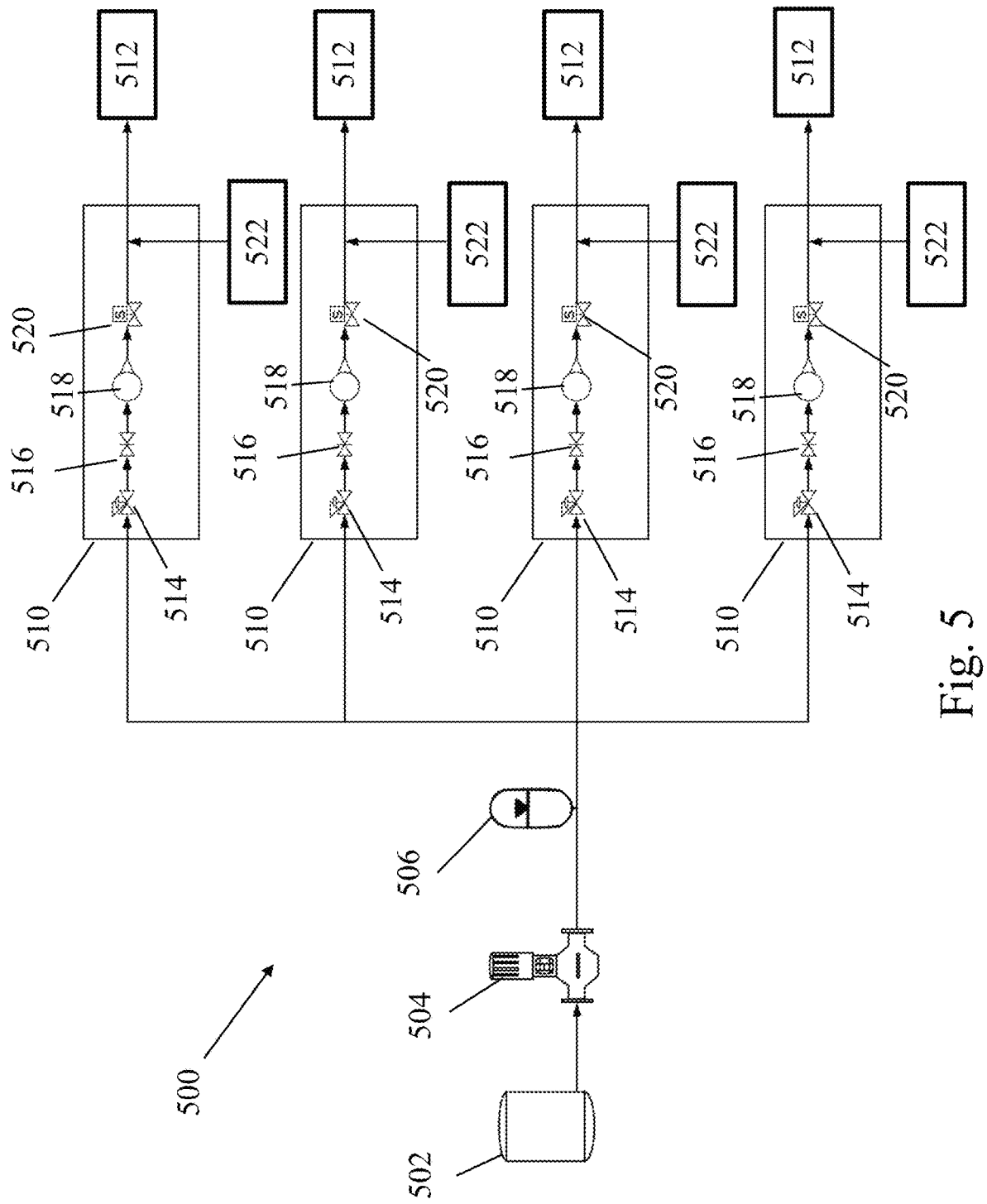
FIG. 5 is a schematic representation of a centralized lubricant delivery system, according to some embodiments.

Referring now to FIG. 5, one embodiment of a centralized lubrication delivery system 500 is described in more detail. The system 500 includes a centralized lubricant reservoir 502, a pump 504 (e.g., a hydraulic pump), and a storage vessel 506 (e.g., a hydraulic accumulator), from which lubricant may be distributed to a plurality of lubricant modules 510. Each lubricant module may be coupled to one or more machining tools 512 and may be configured to provide a desired flow rate of lubricant to the attached machining tool(s). In particular, each lubricant module 510 may include a pressure reducing regulator 514, a needle valve 516, an optional flow meter 518, and a solenoid valve 518. The regulator and valves may be configured to provide the desired flow rate and/or pressure of the lubricant for a particular machining process at a machining tool 512. Moreover, each lubricant module 510 may include a machining fluid supply 522 through which a machining fluid, such as a supercritical machining fluid, may flow to mix with the lubricant before being delivered to the machining tool 512. While a lubricant distribution system including four lubricant modules is shown in FIG. 5, it should be understood that the current disclosure is not limited to any particular number of lubricant modules and/or machining tools to which a lubrication delivery system delivers lubricant.

While the lubricant modules 510 are depicted as being positioned outside of the associated machining tools 512 in FIG. 5, it should be appreciated that other configurations may be suitable. For example, in some embodiments, the lubricant modules may be configured as an internal component of a machining tool (e.g., a lubricant module may be positioned within a housing of a machining tool) or may be directly attached to a machining. Similarly, it should be appreciated that one or more additional components and/or systems described above, such as components of a machining fluid distribution system, also may be configured as a component of a machining tool, and may be directly attached to and/or positioned within a housing of the machining tool.

As noted above, in some embodiments, the systems described herein may include one or more controllers configured to operate various aspects of the machining systems, such operation of one or more valves operatively coupled to one or more pressure sensors, and/or temperature sensors. Such embodiments described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, such as a smart phone or any other suitable portable or fixed electronic device.

Also, a controller and/or computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such controllers and/or computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A system for distributing a supercritical machining fluid, the system comprising:
    a storage tank constructed and arranged to store a liquid and having an outlet positioned adjacent a bottom portion of the storage tank;
    a pressure booster fluidly coupled to the outlet and constructed and arranged to receive the liquid from the storage tank and increase a pressure of the liquid to a first pressure greater than a critical pressure of the liquid;
    a heater fluidly coupled to the pressure booster and constructed and arranged to increase a temperature of the liquid to a first temperature greater than a critical temperature of the liquid, wherein upon increasing the pressure of the liquid to the first pressure and increasing the temperature of the liquid to the first temperature, the liquid transforms into a supercritical fluid;
    a storage vessel fluidly coupled to the heater, the storage vessel constructed and arranged to receive the supercritical fluid and maintain a pressure of the supercritical fluid greater than the critical pressure of the liquid and a temperature of the supercritical fluid greater than the critical temperature of the liquid;
    a distribution system fluidly coupled to the storage vessel and constructed and arranged to deliver the supercritical fluid from the storage vessel to a plurality of machining tools, wherein the plurality of machining tools is a plurality of cutting tools; and
    a plurality of lubrication modules in fluid communication with the distribution system, wherein each lubrication module of the plurality of lubrication modules includes a pressure reducing regulator configured to provide a desired flow rate of the supercritical fluid to an associated machining tool of the plurality of machining tools;
    wherein the system further comprises the plurality of machining tools, and wherein at least one of the machining tools comprises a rotary union configured to be lubricated with the supercritical fluid.

2. The system of claim 1, wherein the storage vessel comprises one or more heating elements, and wherein the storage vessel comprises a controller configured to control the heating elements to maintain the supercritical fluid above a supercritical temperature of the supercritical fluid.

3. The system of claim 1, wherein the storage vessel is one of a plurality of storage vessels, and wherein each storage vessel of the plurality of storage vessels is coupled to a subset of machining tools of the plurality of machining tools.

4. The system of claim 1, wherein the plurality of machining tools is located within a machining facility, and the storage tank, pressure booster, heater, and storage vessel are located exterior to the machining facility.

5. The system of claim 1, wherein the pressure booster is at least one selected from the group consisting of a cryogenic pump, a gas blanket, and a gas booster.

6. The system of claim 1, wherein the heater is an electric vaporizer.

7. The system of claim 1, wherein the storage vessel comprises a plurality of tanks fluidly coupled to one another.

8. The system of claim 1, wherein at least one machining tool of the plurality of machining tools includes a valve configured to facilitate switching between the supercritical machining fluid and a non-supercritical machining fluid.

9. The system of claim 1, wherein at least one machining tool of the plurality of machining tools comprises:
    a spindle;
    a pressure transducer configured to sense a pressure of the supercritical fluid upstream from the spindle;
    a valve configured to purge the at least one machining tool; and
    a processor configured to operate the valve to purge the at least one machining tool based at least in part on the sensed pressure in at least one operating mode.

10. The system of claim 1, wherein the liquid comprises liquid carbon dioxide.

11. The system of claim 10, wherein the supercritical fluid comprises supercritical carbon dioxide.

12. The system of claim 1, further comprising one or more lubricant distribution systems constructed and arranged to deliver lubricant to the plurality of machining tools.

13. The system of claim 12, wherein the plurality of lubrication modules is in fluid communication with the one or more lubricant distribution systems, and wherein the plurality of lubrication modules is configured to combine the lubricant with the supercritical fluid, and wherein each lubrication module of the plurality of lubrication modules is in fluid communication with one or more machining tools of the plurality of machining tools.

14. The system of claim 12, wherein the lubricant is combined with the supercritical fluid before being delivered to the plurality of machining tools.

15. A method of distributing a supercritical machining fluid, the method comprising:
    flowing a liquid from a storage tank to a pressure booster;
    raising a pressure of the liquid to a first pressure greater than a critical pressure of the liquid with the pressure booster;
    heating the liquid at the first pressure to a first temperature greater than a critical temperature of the liquid, wherein upon increasing the pressure of the liquid to the first pressure and increasing the temperature of the liquid to the first temperature, the liquid transforms into a supercritical fluid;
    maintaining a pressure of the supercritical fluid greater than the critical pressure of the liquid and a temperature of the supercritical fluid greater than the critical temperature of the liquid;
    providing a desired flow rate of the supercritical fluid to a plurality of machining tools using a plurality of lubrication modules; and
    lubricating a rotary union of a first machining tool of the plurality of machining tools using the supercritical fluid, wherein the plurality of machining tools is a plurality of cutting tools.

* * * * *